F. W. BURPEE.
PAPER RECEPTACLE MAKING APPARATUS.
APPLICATION FILED NOV. 13, 1911.

1,075,329.

Patented Oct. 14, 1913.

Witnesses
James E. Sproll
Clara A. Harm

Inventor
Frank W. Burpee.

By Adams & Brooks
Attorneys.

F. W. BURPEE.
PAPER RECEPTACLE MAKING APPARATUS.
APPLICATION FILED NOV. 13, 1911.

1,075,329.

Patented Oct. 14, 1913.
6 SHEETS—SHEET 6.

Witnesses
James E. Sproll.
Clara A. Harm.

Inventor
Frank W. Burpee.
By Adams & Brooks
Attorneys.

UNITED STATES PATENT OFFICE.

FRANK W. BURPEE, OF BELLINGHAM, WASHINGTON.

PAPER-RECEPTACLE-MAKING APPARATUS.

1,075,329.

Specification of Letters Patent.   Patented Oct. 14, 1913.

Application filed November 13, 1911.   Serial No. 660,156.

*To all whom it may concern:*

Be it known that I, FRANK W. BURPEE, a citizen of the Dominion of Canada, and a resident of the city of Bellingham, in the county of Whatcom and State of Washington, have invented certain new and useful Improvements in Paper-Receptacle-Making Apparatus, of which the following is a specification.

My invention relates to apparatus of the above type, having more particular reference to apparatus for providing receptacle bodies with closures, and has for a fundamental object the provision of novel means for accurately presenting the open ended receptacles to the closure inserting mechanism.

A further object resides in the provision of novel mechanism for forming the closures, and further, in means for positioning and securing such closures in the receptacle bodies.

Other objects will be set forth as my description progresses and those features of construction, arrangements and combinations of parts on which I desire protection, succinctly defined in my annexed claims.

Referring to the accompanying drawings, illustrating my invention in such form as now preferred by me, and wherein like characters of reference indicate like parts throughout.

In this embodiment of my invention, I have provided mechanism for inserting both the top and bottom closures in previously prepared bodies, which latter are advanced through the machine by a plurality of rotary carriers, as 1, 2, 3 and 4, fixedly mounted on shafts 1', 2', 3' and 4' respectively, journaled on a frame 12. These carriers which are arranged to successively receive and advance a receptacle, as 5, each comprise a pair of spaced disks 7, 7', conveniently formed in their edge portions with cut-outs or seats 6, 6' respectively, the seats of disk 7, of which four are provided, lying opposite to and desirably being deeper than those of disk 7' when operating on tapered receptacles, as shown, to thereby enable the latter being supported on the carrier with their axes parallel therewith.

Fixed for rotation with carrier 1 is a receptacle closure or end wall support 8, this insuring of the closure being properly positioned or centered for insertion into the receptacle body. Support 8, as now considered, is in the form of a conveyer, consisting of a disk connected, as by a hub part 9 with disk 7 and being formed with inwardly tapering apertures 8' which aline with the adjacent seats 6'.

Reference numeral 10 indicates closure seats provided on the outer side face of support 8, the same consisting of substantially U-shaped bosses extending part way around respective apertures 8' and having their open sides facing the edge of the support for reception of the closures from a chute 11.

Figure 8:
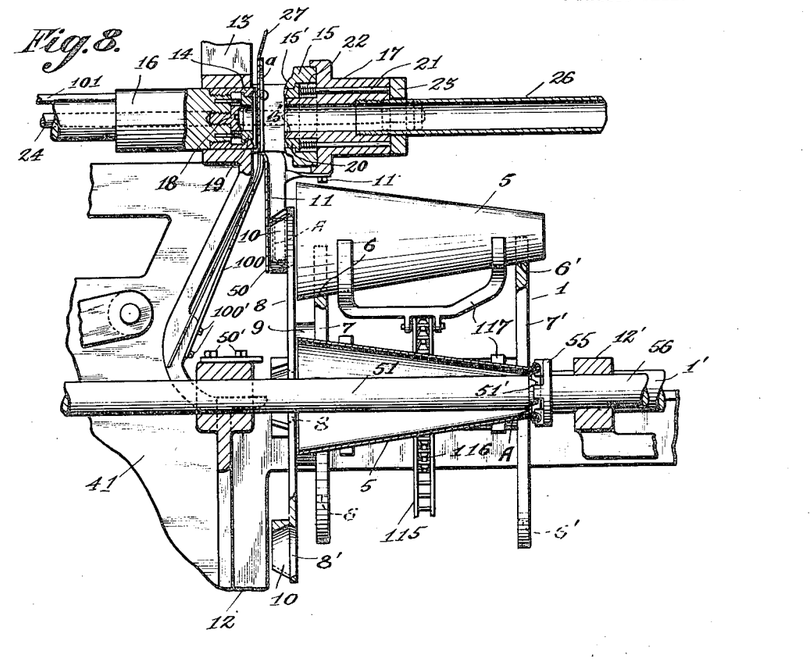
Fig. 8 is a fragmentary cross section showing more particularly the top closure forming mechanism, and the correlated inserting and crimping device operating on a receptacle.
Figure 9:
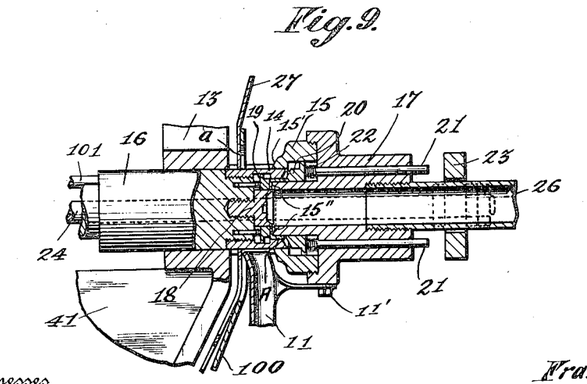
Fig. 9 is a fragmentary section illustrating the top closure forming dies in operation.

Chute 11 which is bolted, as at 11', to bracket extension 17 has its lower end portion cut-out for reception of the edge portion of support 8 (see Fig. 8), and from such cut-out lower end portion a guard plate 50 extends, the latter being secured, as at 50', to frame 12 and following the edge portion of support 8 in the direction of rotation thereof, to prevent outward displacement of the closure or end wall during its conveyance to an inserting device 51. Closure seats 10 are restricted slightly in a direction outwardly from the side face of support 8, see Fig. 8, to prevent accidental displacement of the closure, as is apparent.

Reference numerals 14 and 15 indicate hollow cutting and forming dies arranged above and on opposite sides of chute 11, the said die 14, or male die, being carried by a reciprocatory slide 16, guided on a bracket 41 and operating through a suitable aperture of an upright 13 of frame 12, while die 15 is fixed to a bracket extension 17 of said upright. Die 15 is provided with a cutting edge 15′ and an internal annular forming section 15″, the latter being spaced inwardly from the former to permit of the entrance therebetween of die 14, which latter flares slightly to its cutting edge to thereby first coact with cutting edge 15′ to cut the blank, as A, and then during further advance movement bend the edge portion of such blank over forming section 15″.

Reference numeral 19 indicates a yieldingly held presser consisting of a ring encircling an internal auxiliary cutting die 18 of die 14, the same during advance movement of said die 14 pressing and firmly holding the blank against forming section 15″, subsequently to which die 18 moves into die forming section 15″ and, coacting with the inner edge thereof, cuts the usual outlet opening in the formed blank which is to serve as the top wall of the receptacle.

Reference numeral 26 indicates a tube communicating with the bore of die 15 for conducting the waste center cuttings from the blanks to a suitable point of discharge. An ejector 20 is slidably mounted in die 15 on the forming section 15″ thereof, the same being provided with rearwardly extending stems 21 which project to the rear of the die for movement into the path of a positive actuator 23, slidably mounted on tube 26. Springs 22 are also preferably engaged with stems 21 to project the ejector 20, these acting quickly upon withdrawal of die 14, but as such yielding means is not as certain in its action as is desirable, I provide the positive actuator 23, which being connected by rods 24 to pins 25 of slide 16 to reciprocate with die 14, will in the event of springs 22 failing to perform their function, strike stems 21 and thereby operate the ejector.

Reference numeral 26′ indicates a roller rotatably mounted on upright 13 above dies 14 and 15 and carrying a roll of paper 27 which is fed downwardly in a step by step manner between said dies by a feed roller 28, journaled in upright 13, the strip of paper being held in engagement with feed roller 28 by a presser roller 29, journaled in a gravity held swing frame 30.

Figure 1:
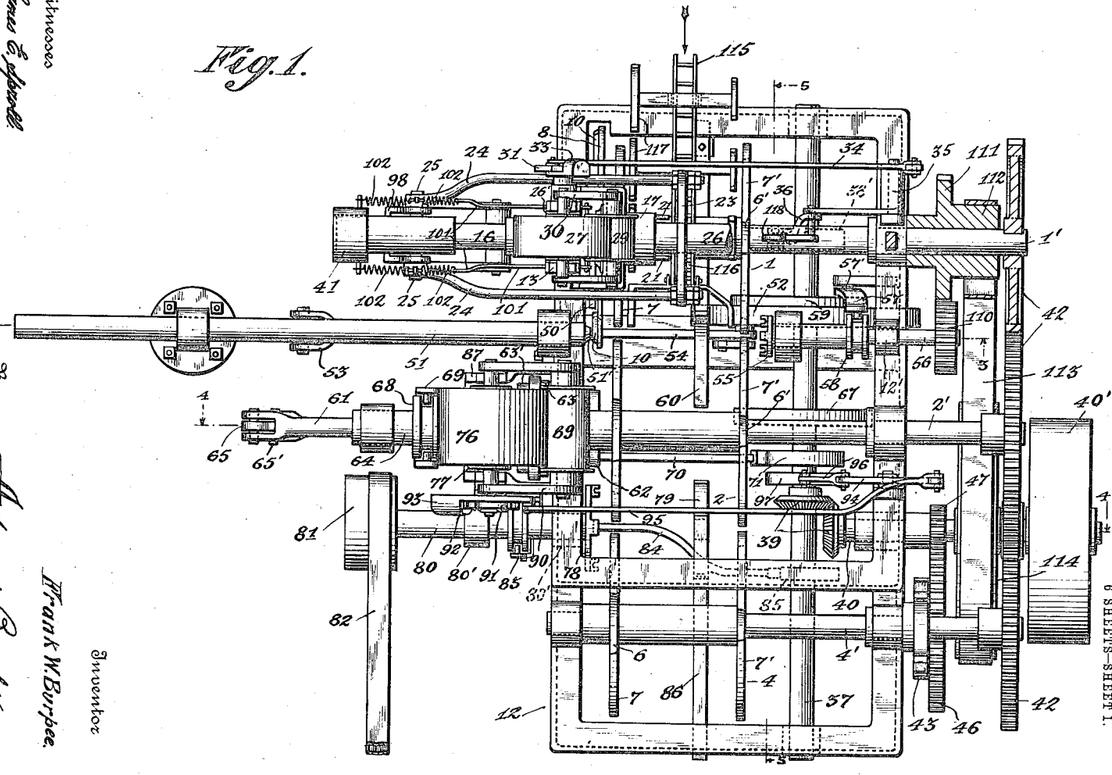
Figure 1 is a top plan, parts being broken away.
Figure 2:
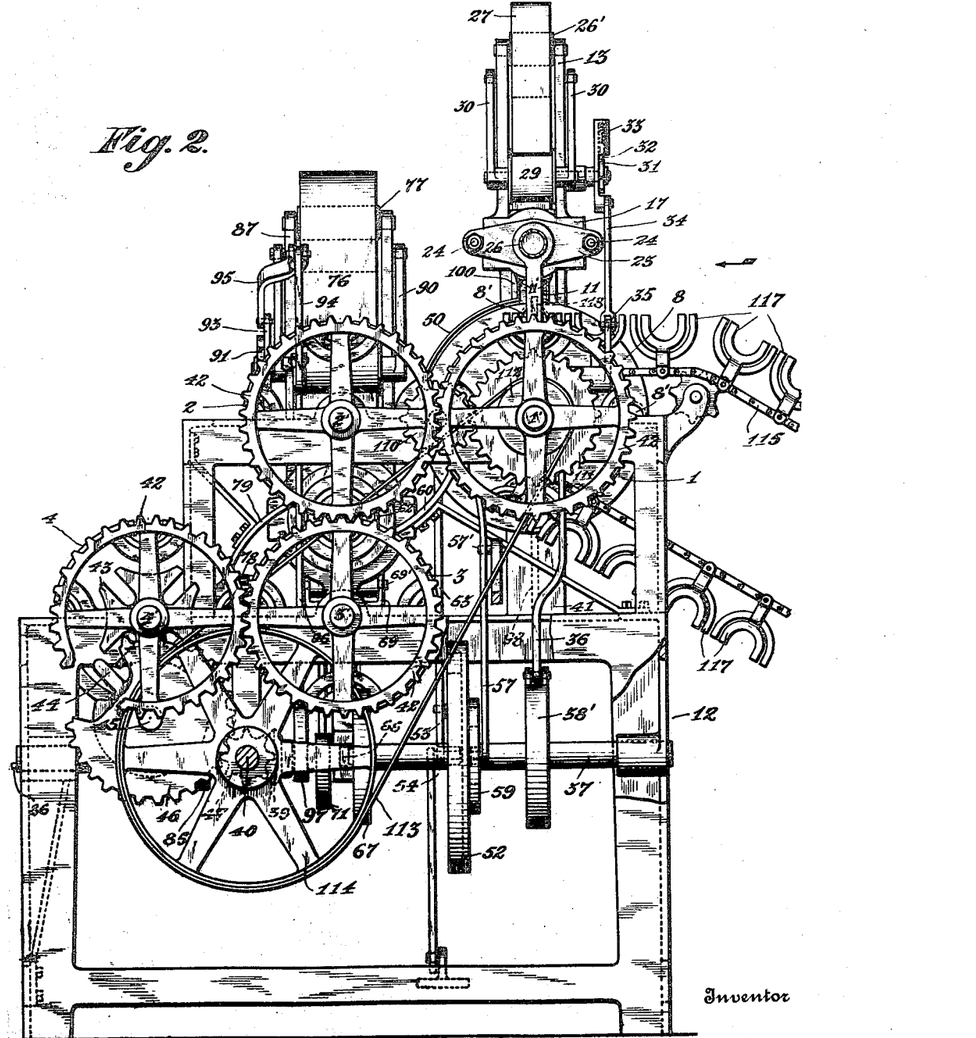
Fig. 2 is a side elevation with portions broken away.
Figure 3:
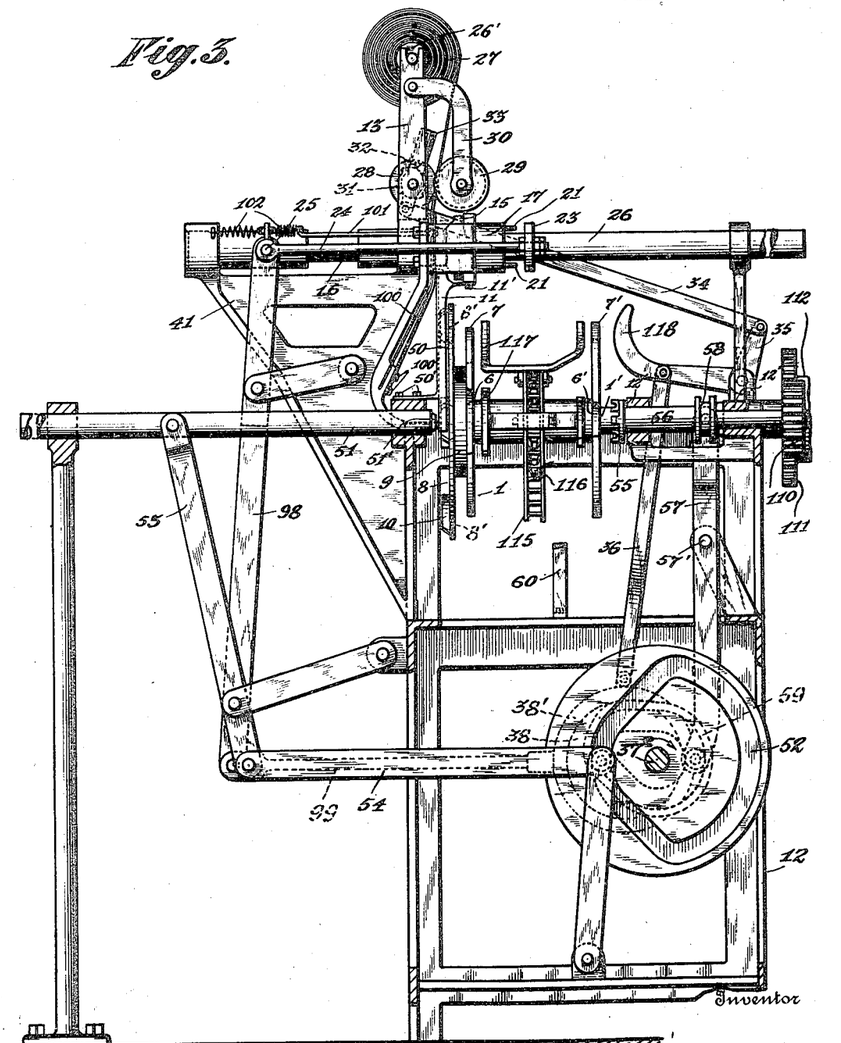
Fig. 3 is a vertical cross section taken on line 3—3 of Fig. 1.

Reference numeral 31 indicates a ratchet wheel fixed to the shaft of feed roller 28, and 32 a spring pressed driving pawl therefor, the said pawl being mounted on an oscillatory lever 33, journaled on said feed roller shaft and connected with a link 34, having driving connection with a continuously driven shaft 37 through the medium of a bell crank lever 35 and pitman 36, the latter being connected by a suitable strap 38′ with an eccentric 38 on said shaft. Slide 16 is connected through the medium of a lever 98 and a driving rod 99 with strap 38′, see Fig. 3.

Reference numeral 100 indicates a movable guide for the strip of paper 27, the same being connected with rods 101, slidably engaged with lever 98 and having a yielding driving connection therewith through the medium of springs 102, for movement of its upper end portion in common with slide 16, which last named end portion of guide 100 is apertured, as at a, to permit of its clearing die 15 for proper coaction of the latter with die 14 which following forward movement of said guide engages the strip of paper and presses the same against die 15 to effect the cutting of the blank, as hereinbefore set forth. Guide 100 is secured at its lower end portion, as at 100′, to bracket 41 and has its upper end portion lying at the forward side of the strip of paper 27 so as to be capable of moving the latter clear of the path of travel of the formed closure to chute 11. Shaft 37 is connected through bevel gearing 39 with a drive shaft 40, having a drive pulley 40′, to which power is communicated, as by a belt, not shown.

Fixed to shafts 1′, 2′, 3′ and 4′ are spur gears, as 42, these being in mesh for simultaneous movement under control of an intermittent drive mechanism comprising a slotted wheel 43 and single tooth wheel 44 which during each operation advances wheels 42 a quarter turn. Said wheel 43 is fixed to shaft 4′ and wheel 44 fixed to a shaft 45 having a gear wheel 46, meshing with a pinion 47 on drive shaft 40.

The extent of movement of carriers 1, 2, 3 and 4 during a step corresponds to the spacing of the receptacle seats thereon, by which arrangement seats of adjacent carriers will during pauses of the latter directly oppose one another and engage a receptacle to steady or hold the same pending the operation of correlated mechanisms, to be described.

In the operation of the mechanism thus far described, power being applied to shaft 40, shaft 37, through the intermediacy of gearing 39, is driven continuously thereby oscillating pawl carrier or lever 33 to feed the strip of paper 27 downwardly between dies 14 and 15, immediately following which slide 16 is advanced for effecting the cutting and forming of the blank. Prior to the retraction of slide 16 and the consequent ejection of the formed blank from die 15, carrier 1 carrying a receptacle body to be operated upon is advanced to position the related seat 10 of rotary support 8 directly beneath chute 11, through which latter the flanged closure falls by gravity. Subsequently to the seating of the closure on support 8, carrier 1 is moved another step to convey the same in front of the inserting device 51. Inserting device 51 comprises a slide member or plunger having its forward end provided with a tapered nose 51′, and is reciprocated by lever 53, and driving rod 54, which latter is provided with a suitable follower engaging an internal cam 52 on shaft 37. (See Fig. 3.) As carrier 1 with its receptacle body and closure comes to a pause in operative position with respect to inserting device 51, the latter is moved forwardly to force the closure through the receptacle body to obtain a slight projection of its edge flange beyond the reduced end thereof, in which position said closure is held on nose 51′ of the inserting device for action thereon by a crimper 55 which latter is advanced gradually to effect an outward bending of the free edge portions of the closure and receptacle, as indicated more clearly in Fig. 8. In this connection it will be observed, that primary advance movement of a closure from its seat 10 is retarded through contact with the inwardly restricted openings 8′ of support 8 to thereby permit of the nose 51′ of inserting device 51 firmly wedging or seating itself in the central opening of the closure. Crimper 55 conveniently comprises a plurality of bifurcated jaws mounted concentrically on a head fixed to a shaft 56, which latter is supported for rotation and endwise movement in bearings 12′ of frame 12. For shifting shaft 56 to and from the receptacle body, I provide a shifter lever 57 fulcrumed at 57′ and having one end engaged in a circumferential groove of a collar 58 on said shaft, and its opposite end portion provided with a suitable follower engaging a cam 59 on shaft 37.

Reference numeral 110 indicates a wide pinion fixed to shaft 56 and meshing with a gear 111, loosely mounted on shaft 1′ and having an integral pulley 112 over which a belt 113 takes, the said belt also taking over a pulley 114 fixed to shaft 40.

Figures 4, 6, 7:
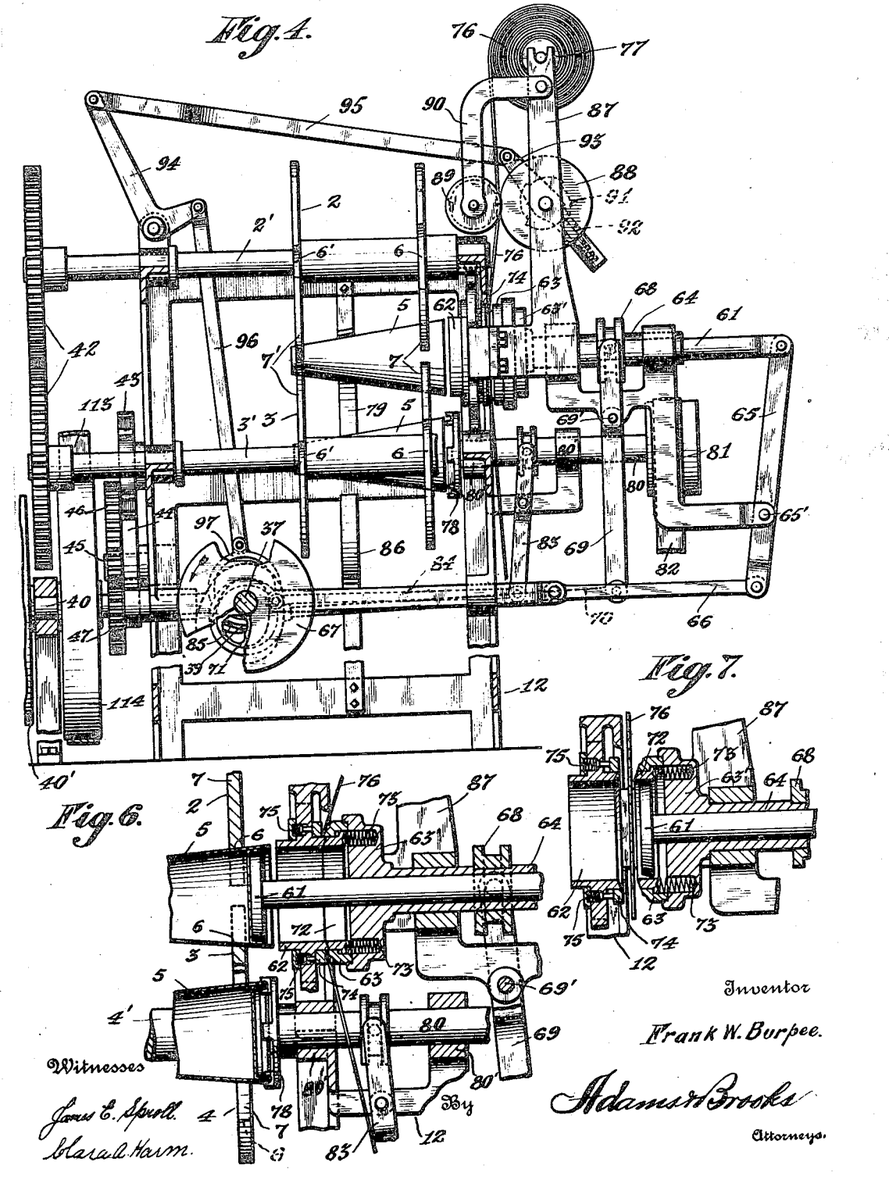
Fig. 4 is a similar section taken on line 4—4 of Fig. 1, the bottom closure blank cutting dies being in open position.
Fig. 6 is a fragmentary sectional view illustrating more particularly the bottom closure or wall cutting and inserting mechanism and the adjacent crimping mechanism, as in operation.
Fig. 7 is a fragmentary section of the bottom closure blank cutting and forming dies in open position.
Figure 5:
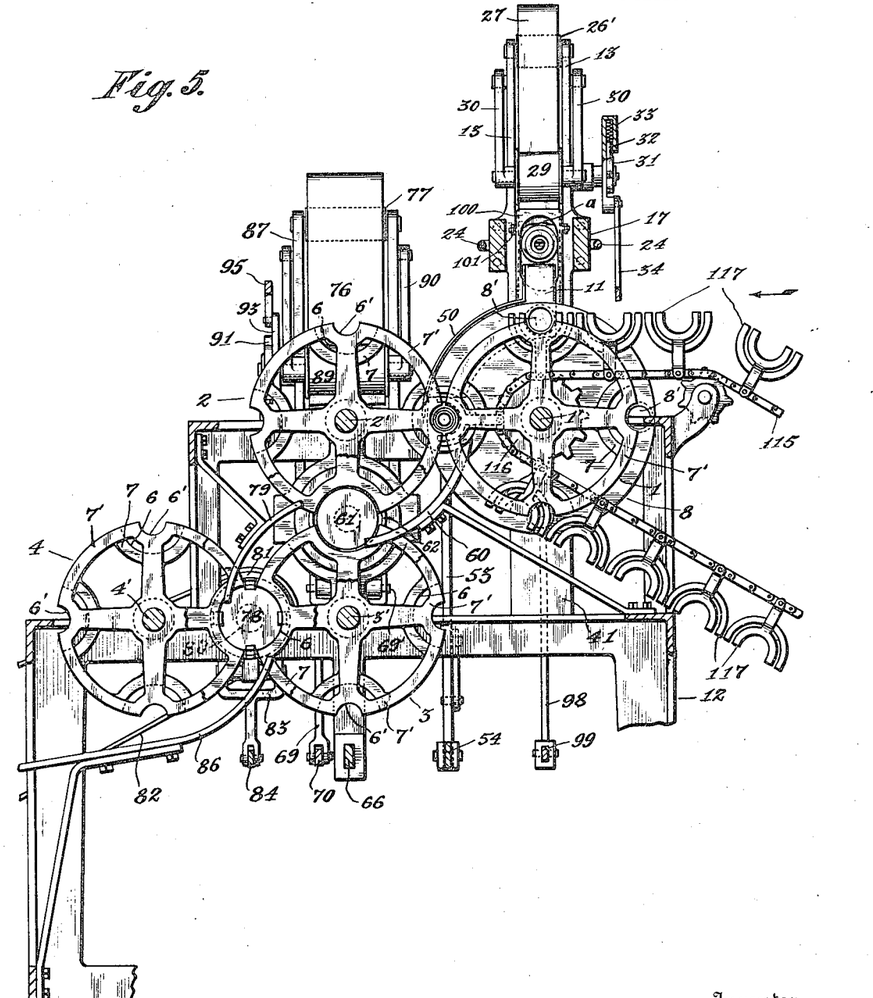
Fig. 5 is a vertical longitudinal section taken on line 5—5 of Fig. 1, with portions broken away.

Following the crimping operation to the top closure to the receptacle, inserting device 51 and crimper 55 are retracted and on the next step of the carriers, the receptacle is conveyed to a bottom wall inserting device 61, the receptacle at such time being held for movement with carrier 2, by a relatively fixed guide 60, which latter projects upwardly into carrier 1 at the outer side of the path of the receptacles, as more clearly shown in Fig. 5. Inserting device 61, which is in the form of a plunger, as now considered acts in conjunction with a hollow die 62, fixed to frame 12 at the side of the path of carriers 2 and 3, to first form the second or bottom wall, by forcing the blank inwardly into said die and then by its further movement force the formed bottom through said die into the receptacle, as shown in Fig. 6. Coöperating with die 62 is a female die 63, the latter being fixed on a head 63′ of a hollow slide 64, slidably supported on frame 12 and slidably receiving the stem of plunger 61, which stem projects outwardly from said slide and has connection with an actuating lever 65, fulcrumed at 65′, and connected with a driving rod 66, connected for reciprocatory movement by an internal cam 67 on shaft 37. Slide 64 is provided with a grooved collar 68 in which a shifting lever 69, fulcrumed at 69′, engages. Lever 69 is connected with a driving rod 70 which in turn is connected with an eccentric 71 on shaft 37. Within die 63 is an annular presser ring 72, yieldingly held by springs 73.

Reference numeral 74 indicates a stripper, the same conveniently being in the form of a ring slidably engaged on die 62, and provided on its rear face with short stems or lugs, as shown, with which springs 75 engage, the latter serving to advance the stripper upon backward movement of die 63 and thereby remove the strip of paper, as 76, from die 62, as will be readily understood. The strip of paper 76, is preferably wound on a roller 77, rotatably mounted in frame upright 87, and is fed downwardly between dies 62 and 63 following retractive movement of plunger 61 and die 63, the said plunger being moved into presser 72 with a slight spacing forwardly of the adjacent face of head 63′.

Following a feeding operation of roller 77, die 63 is advanced to thereby cut the blank at which time presser 72 will be engaging the strip of paper 76 and serve to hold and smooth the edge portion of the cut blank as the latter is drawn into die 62 by plunger 61, which is advanced immediately following the initial portion of advance movement of die 63. Upon withdrawal of plunger 61 from the receptacle, the latter is conveyed by carrier 3 to a crimper 78, a relatively fixed guide 79 holding the receptacle on the carrier until it is engaged in a seat of carrier 4. Crimper 78 which corresponds in general construction to crimper 55 is fixed to a shaft 80, supported for endwise and rotary movement in bearings 80′ of frame 12. Power is applied to crimper shaft 80 to drive the same continuously by a belt 82 taking over a pulley 81 thereof, the said pulley being comparatively wide to permit of proper operative condition with its belt being maintained during endwise shifting of said shaft to bring crimper 78 into engagement with the free bottom edge portion of the receptacle which is to be bent or crimped inwardly over the edge flange of the bottom wall. For effecting this endwise movement of shaft 80, I provide a shifter lever 83 engaging a suitably grooved collar of said shaft and connected by a driving rod 84 with an eccentric 85 on shaft 37. During the next step like movement of the rotary carriers, carrier 4 moves the finished receptacle along an inclined guide 86 for delivery from the machine.

Reference numeral 88 indicates a feeding roller against which the paper strip 76 is held by a roller 89, journaled in a swing frame 90. Feed roller 88 is journaled in upright 87 and provided on one end of its shaft with a ratchet wheel 91, having associated therewith a yieldingly held driving pawl 92, mounted on a pivotally supported carrier 93, which is oscillated to impart intermittent driving steps or impulses to feed roller 88. A convenient mechanism for obtaining such step by step movement of roller 88, comprises a bell crank lever 94, having one of its arms connected by a link 95 with pawl carrier 93, and its other arm connected with a driving rod 96, which is given a vertical reciprocatory motion by an eccentric 97 on shaft 37.

Reference numeral 115 indicates a conveyer for feeding the open receptacle bodies to carrier 1, the same comprising a belt taking over a sprocket wheel 116 on shaft 1' and provided with suitable receptacle supports 117, spaced to register with the seats of carrier 1. During movement of conveyer 115 and carrier 1, the upwardly moving seats 7, 7' of the said carrier are brought into supporting engagement with a receptacle on a support 117 at a point substantially directly in front of chute 11. Should the receptacle project too far from or beyond seat 7', this will be corrected by a positioning device 118, comprising a curved oscillatory arm, the same being fixed to lever 35 and adapted to, during downward movement, which occurs during the periods of rest of carrier 1, engage the improperly seated receptacle and through its cam or curved face shift the same endwise.

Having thus described my invention, what I claim as new, and desire to secure by Letters Patent of the United States of America, is:—

1. In a machine of the character described, means for supporting an open ended receptacle, a closure forming device, a closure inserting device, means supporting said closure inserting device for movement into the receptacle, means for directing a closure from said forming device into the path of said inserting device, a crimping means, and means for operating said crimping means for action on the closure subsequently to its being positioned by said inserting device.

2. In a machine of the character described, means for supporting an open ended receptacle, a closure inserting device, means for advancing and retracting said device, a crimping device, means for moving said crimping device to and from the receptacle held by said first means, and a second device for inserting a closure in the receptacle subsequently to active operation of said crimping device.

3. In a machine of the character described, means for supporting an open ended receptacle, a crimping means, means for inserting a closure into the receptacle and holding the same for action thereon by said crimping means, and a second means for inserting a closure in the receptacle subsequently to active operation of said crimping means.

4. In a machine of the character described, means for supporting an open ended receptacle, means supported for movement into the receptacle through one end thereof for positioning and holding a closure in the opposite end of said receptacle, means for securing the closure in the receptacle, means for operating said last named means while the closure is held by said first named means, and another means for inserting a closure into the receptacle subsequently to active operation of said second named means.

5. In a machine of the character described, means for supporting an open ended receptacle, a closure inserting means supported for movement into a receptacle held by said first means, means for operating said closure inserting means to position and hold a closure in the receptacle, a crimper supported for rotary and endwise movements, means for shifting said crimper toward the closure subsequently to the positioning of the latter in the receptacle, a second closure inserting means, and means for operating said second closure inserting means to insert a closure into the receptacle subsequently to active operation of said crimper.

6. In a machine of the character described, a carrier supported for movement, means on said carrier for holding an open ended receptacle, a closure inserting device supported for movement crosswise of the path of said carrier, means for intermittently operating said carrier, means for operating said device to insert a closure into a receptacle on said carrier during a pause of the latter, means for securing the closure in the receptacle, and means for inserting a second closure in the receptacle subsequently to the operation of said securing means.

7. In a machine of the character described, a carrier supported for movement and provided with means for holding an open ended receptacle, a closure inserting device supported at the side of the path of said carrier, a closure securing device supported at the opposite side of the path of said carrier, means for intermittently operating said carrier, means for operating said devices during a pause in the movement of said carrier, and means beyond said closure inserting device for applying a second closure to the receptacle.

8. In a machine of the character described, a carrier supported for movement and provided with means for holding an open ended receptacle, a closure inserting device supported at the side of the path of said carrier for movement crosswise of the latter, a closure securing device supported at the opposite side of the path of said carrier, means for operating said carrier to position a receptacle between said devices, means for advancing and retracting said inserting device, means for operating said securing device to secure the inserted closure, and means for applying a second closure to the receptacle subsequently to active operation of said closure inserting device.

9. In a machine of the character described, a receptacle carrier supported for movement, means for intermittently operating said carrier, a closure inserting device supported at the side of the path of said carrier for movement crosswise thereof, means for holding a closure in front of said device for insertion thereby into a receptacle on said carrier, means for operating said device during a pause of said carrier, and means for applying a second closure to the receptacle arranged beyond said closure inserting device.

10. In a machine of the character described, a closure inserting device, means for cutting closures, means for advancing closures and receptacles to said device, means for directing a closure from said cutting means to said advancing means, and means for operating said device to insert a closure advanced by said advancing means into an advanced receptacle.

11. In a machine of the character described, a closure forming means, means for feeding closures from said forming means, a closure inserting device spaced from said forming means, means for conveying closures from said feeding means to said device, means for conveying receptacles to said device, and means for operating said device to insert a closure into a receptacle advanced by said conveying means.

12. In a machine of the character described, a closure forming means, means for directing closures therefrom, a closure inserting device, means for advancing a closure from said directing means to said device in common with an open ended receptacle, and means for operating said inserting device to insert a closure into the receptacle advanced by said advancing means.

13. In a machine of the character described, a rotary receptacle carrier, a rotary closure carrier disposed at one end of said first named carrier provided with a tapering passage-way for a closure, means for rotating said carriers, and means at the side of the path of said last named carrier for moving a closure through the said carrier passage-way and inserting the same into a receptacle on said first named carrier.

14. In a machine of the character described, a rotary receptacle carrier, a rotary closure carrier disposed at one end of said first named carrier provided with a seat for a closure and with a passage-way leading from said seat, means at the side of the path of said last named carrier for moving a closure through the passage-way thereof and inserting the same into a receptacle on said first named carrier, means for intermittently rotating said carriers, and means for operating said first named means during the pauses of said carriers.

15. In a machine of the character described, a pair of carriers, each provided with receptacle holding means, means movably supporting said carriers for simultaneous engagement of their receptacle holding means with a receptacle, means for supporting a closure in opposing relation to a receptacle held by said carriers provided with a passage-way for a closure, and mechanism arranged for moving a closure through the passage-way of said last named means into a receptacle held between said carriers.

16. In a machine of the character described, a pair of rotary carriers provided at their peripheral portions with seats, said carriers being arranged one beyond the other, means for rotating said carriers to bring the seats of one into registration with those of the other, whereby a receptacle conveyed by one carrier will be held therebetween, a closure carrier provided with a seat for a closure, a closure forming means, means for feeding a closure from said forming means, said closure carrier being movable to forward a closure from said feeding means to a point adjacent to the receptacle held between said first carriers, and mechanism arranged for moving a closure from the seat of said closure carrier into a receptacle held conjointly by said carriers.

17. In a machine of the character described, a pair of movable carriers each provided with a receptacle holding means, closure inserting means arranged at the side of the path of said carriers, means supporting said carriers in proximity to one another for simultaneous engagement of their receptacle holding means with a receptacle at a point opposite said closure inserting means, means for supporting a closure in the path of said inserting means provided with a passage-way, and means for operating said closure inserting means to move a closure through the passage-way of said closure supporting means into a receptacle held between said carriers.

18. In a machine of the character described, a receptacle carrier supported for movement provided with receptacle seats spaced apart, means for operating said carrier intermittently, means movable between the seats of said carrier for advancing a receptacle thereto, means movably supported at the side of the path of said carrier for centering a receptacle on the latter, and means for operating said second named means during a pause in the movement of said carrier.

19. In a machine of the character described, a receptacle carrier supported for rotary movement provided with seats for opposite end portions of a receptacle, means for imparting intermittent movement to said carrier, means movable between the seats of said carrier for advancing a receptacle thereto, a device for effecting endwise adjustment of receptacles on said carrier arranged at the side of the path of the latter, and means for operating said device to adjust a receptacle during a pause of said carrier.

20. In a machine of the character described, movable means for supporting an open ended receptacle, means at the side of and movable with said first named means provided with a seat for holding a closure, an inserting device supported adjacent to the path of said first means for movement through the seat of said last named means for removing the closure therefrom and inserting the same into a receptacle on said first means, said second means being provided with an inwardly extending portion for resisting removal of a closure from its seat by said inserting device, for the purpose specified.

21. In a machine of the character described, movable means for supporting an open ended receptacle, a U-shaped receptacle closure seat movable with said means having a restricted discharge passage at one side, and a closure inserting device supported for movement to move a closure from said seat through the restricted discharge passage thereof into a receptacle on said means.

22. In a machine of the character described, a rotary carrier provided with companion seats for a receptacle, an endless conveyer extending between the seats of said carrier for feeding a receptacle into the seats of said carrier, a closure inserting device at the side of the path of said carrier, means for operating said carrier and said conveyer simultaneously in an intermittent manner, and means for operating said device during a pause in the movement of said carrier.

23. In a machine of the character described, a closure carrier supported for movement, closure forming means, means for directing the formed closures from said first means to said carrier, a closure inserting device arranged at one side of the path of said carrier, a supporting means on the opposite side of said carrier for holding an open ended receptacle, means for operating said carrier intermittently to advance a closure to said inserting device, and means for operating said inserting device to insert a closure on said carrier into a receptacle on said supporting means.

24. In a machine of the character described, in combination with a closure support provided with a seat for the closure, a pair of closure cutting and forming dies one of which is supported for movement toward and from the other, means for feeding a strip of paper between said dies in a step by step manner, means for directing a closure from said dies into the seat of said support, and movable guide means for moving the cut strip of paper out of the path of the formed closures.

25. In a machine of the character described, a carrier for an open ended receptacle, means for operating said carrier intermittently, a female forming die arranged at the side of the path of said carrier, means for cutting a blank, means for yieldingly holding the cut blank against said female die, a male forming die, and means for operating said male forming die corelatively to movements of said carrier for forming the blank and forcing the same through said female die into a receptacle on said carrier.

26. In a machine of the character described, a closure inserting device, rotatably supported means for advancing a tapered receptacle body to present its base end to said device, means for moving said inserting device into the receptacle body, and means movable with said first means and substantially concentrically therewith for supporting a closure for the small end of the receptacle body in the path of said inserting device.

27. In a machine of the character described, a closure inserting device, means for advancing a receptacle body to present one end thereof to said device to receive a closure, means for moving said device into the receptacle, and means movable with said first means as a unit for supporting at the receiving end of the receptacle body a closure of relatively small diameter.

28. In a machine of the character described, closure inserting means, movable receptacle holding means, means for operating said first means to insert a closure into a receptacle on said holding means, means for operating on the receptacle to secure the inserted closure, a second closure inserting means alongside the path of said holding means, and means for operating said holding means to advance the receptacle to said second closure inserting means.

Signed at Bellingham, Wash., this 2nd day of November 1911.

FRANK W. BURPEE.

Witnesses:
   CHAS. A. SATHER,
   LUCY LOVELACE.